United States Patent
Harp

(10) Patent No.: US 9,631,589 B2
(45) Date of Patent: *Apr. 25, 2017

(54) FUEL FILTER MONITOR FOR FUEL STREAMS

(71) Applicant: W. L. Gore & Associates, Inc., Newark, DE (US)

(72) Inventor: Gary P. Harp, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/049,606

(22) Filed: Oct. 9, 2013

(65) Prior Publication Data

US 2014/0102984 A1 Apr. 17, 2014

Related U.S. Application Data

(60) Provisional application No. 61/714,927, filed on Oct. 17, 2012.

(51) Int. Cl.
*B01D 71/36* (2006.01)
*B01D 63/14* (2006.01)
(Continued)

(52) U.S. Cl.
CPC ............ *F02M 37/221* (2013.01); *B01D 39/08* (2013.01); *B01D 39/1623* (2013.01); *B01D 39/1692* (2013.01); *B01D 63/14* (2013.01); *B01D 67/0027* (2013.01); *B01D 71/36* (2013.01); *B01D 2239/0654* (2013.01); *B01D 2239/1216* (2013.01); *Y10T 156/10* (2015.01)

(58) Field of Classification Search
None
See application file for complete search history.

(56) References Cited

U.S. PATENT DOCUMENTS 3,953,566 A * 4/1976 Gore .................. B01D 71/36
264/127
4,787,949 A 11/1988 Cole et al.
(Continued)

FOREIGN PATENT DOCUMENTS

WO WO 01/34273 5/2001
WO WO 2009/152439 12/2009
WO WO 2013/055525 4/2013

OTHER PUBLICATIONS

Wikiol et al., Expanded Polytetrafluoroethylene Membranes (Jul. 20, 2008, accessed on Nov. 17, 2014).*
(Continued)

*Primary Examiner* — Krishnan S Menon
(74) *Attorney, Agent, or Firm* — Kilpatrick Townsend & Stockton, LLP

(57) ABSTRACT

It has been discovered that the function of a fuel filter monitor can be accomplished without the use of SAP. The present invention provides a fuel filter monitor comprising an ePTFE membrane, a support structure adjacent to said ePTFE membrane wherein the membrane is disposed upstream of the support and said monitor prevents penetration of water to the downstream of said fuel wet monitor, where the water can be in the form of discrete water drops in the fuel, or a bulk water stream which displaces the upstream fuel.

13 Claims, 13 Drawing Sheets

(51) Int. Cl.
*F02M 37/22* (2006.01)
*B01D 67/00* (2006.01)
*B01D 39/08* (2006.01)
*B01D 39/16* (2006.01)

(56) References Cited

U.S. PATENT DOCUMENTS

| | | | | |
|---|---|---|---|---|
| 4,959,141 | A | 9/1990 | Anderson | |
| 5,476,589 | A * | 12/1995 | Bacino | 210/500.36 |
| 6,171,684 | B1 * | 1/2001 | Kahlbaugh | B01D 27/06 |
| | | | | 428/212 |
| 6,997,327 | B2 | 2/2006 | Sprenger | |
| 7,306,729 | B2 * | 12/2007 | Bacino | B01D 39/1692 |
| | | | | 210/500.22 |
| 7,988,860 | B2 | 8/2011 | Kalayci et al. | |
| 2003/0189002 | A1 * | 10/2003 | Proulx et al. | 210/284 |
| 2008/0105629 | A1 * | 5/2008 | Yang et al. | 210/799 |
| 2010/0300295 | A1 | 12/2010 | Yamakawa | |

OTHER PUBLICATIONS

International Search Report PCT/US2013/064224 dated Jan. 17, 2104.

Schneider, et al., "Membranes and Modules for Transmembrane Distillation", *Journal of Membrane Science*, vol. 39, 1988, pp. 25-42.

"Advanced Multi-Spec Fuel/Water Separator Test Stand", Testand 2013 <http://www.testand.com/downloads/Testand-Fuei-Water-Separator-TestStand.pdf>.

"EI 1583 Laboratory tests and minimum performance levels for aviation fuel filter monitors", energy Institute, Aug. 27, 2012.

"Emulsified Water/Fuel Separation Test Procedure—SAE J1488", SAE International Aug. 1997.

* cited by examiner

FUEL FILTER MONITOR FOR FUEL STREAMS

FIELD OF THE INVENTION

The present invention relates to a fuel filter monitor capable of preventing water penetration to its downstream face in fuel streams. More particularly, the invention relates to a fuel filter monitor capable of stopping fluid flow when challenged with a bulk water stream after flow of a fuel stream. The inventive fuel filter monitor is especially useful in fuel streams comprising hydrocarbons with interfacial tensions against water greater than about 23 mN/m including, not limited to petrol, gasoline, and/or middle distillate fuels such as diesel fuel, jet fuel, renewable jet fuel, kerosene and similar fuels, including Fischer-Tropsch fuels, biodiesel, and blends or mixtures thereof.

BACKGROUND OF THE INVENTION

Water contamination of fuel such as petrol, gasoline, and/or middle distillate fuels such as diesel fuel, and jet fuel, is a serious problem. Water contamination can cause corrosion, loss of lubricity, or damage to components of modern engines and fuel systems. Furthermore, water readily freezes in fuel lines, which can have catastrophic consequences if the occurrence takes place, for example, in the fuel lines of aircraft in flight.

To mitigate the risk of this danger two strategies are often employed. The respective strategies are to remove the water from fuel or to add chemical compounds to the fuel which raise the freezing point of water in the fuel. Removal of water from fuel is typically accomplished using a filtration step which often acts via coalescence and separation or by absorption into a polymeric matrix. These technologies are exemplified in coalescer separators used in purification of modern diesel fuel on vehicle or of aviation fuel as described in EI 1550 (Energy Institute Document 1550: Handbook of equipment used for the maintenance and delivery of clean aviation fuel) or by sorbent filter monitors described in EI 1550 and EI 1583 (Energy Institute Document 1583: laboratory tests and minimum performance specifications for aviation fuel filter monitors $6^{th}$ edition). The other respective strategy of chemical addition is also practiced in the protection of aviation fuels by addition of compounds known in the literature as FSII (fuel system icing inhibitors) to the fuel. The most common compound used for this purpose in jet fuel is known as DIEGME (Diethylene glycol monomethyl ether)

A known solution to accomplish water separation from fuel via absorption is the use of a hydrophilic material which takes up water in the presence of fuel. This hydrophilic water absorbing material is chosen to be non-olefinic to prevent its absorption or swelling by the fuel stream. Furthermore, SAP (super absorbing polymers) for water are found to be much preferred for this application. Herein a super absorbent polymer is defined as a polymer capable of taking up more than its own weight in water on swelling. Due to the swelling behavior of absorbent and super absorbent polymer media in the presence of water, the fuel filters and filter media incorporating these polymers lose permeability as they absorb water swelling at the cost of internal pore volume. This can even result in swelling to the point of flow shutoff if the quantity of water uptake per unit area is large. This behavior forms the basis of the fuel filter monitor, a class of water removal filters that are widely used in aviation today. These fuel filter monitors are tightly specified by the aviation industry as described in standard EI 1583 as specified by the Energy Institute in the U.K. The polymers, filter structures and designs of filter monitors in the prior art are described in U.S. Pat. No. 4,959,141, U.S. Pat. No. 6,997,327 and U.S. Pat. No. 7,998,860 and references therein.

In addition to removing water droplets from a fuel stream, fuel filter monitors provide the specific function of stopping fuel flow or positive flow shutoff when challenged with a water slug or water flow stream. This function is critical for applications where risks of bulk water contamination of fuel could be catastrophic, particularly for aviation operations such as in-flight refueling.

Despite successful commercial application of fuel filter monitors they are known to have significant reported short comings and there is a long felt need for an improved solution. These short comings are well-documented in various reports, test standards, and other documents. Documented examples include the EI 1550 handbook, the EI 1583 test standard, discussion in U.S. Pat. No. 4,959,141, U.S. Pat. No. 6,997,327, product bulletins from manufacturers/distributors of these filter monitors, conference reports on research funded by the US military, and other aviation industry groups. One common issue is that after swelling on exposure to a bulk water slug or water stream, modern monitors may continue to pass fuel or water when exposed to a pressure pulse. U.S. Pat. No. 4,959,141 describes a mechanical solution to this common issue. Another problem is described by U.S. Pat. No. 6,997,327. Specifically, that SAP and their performance can be degraded by water soluble contaminants including polar organic molecules, ethers, and inorganic salts. U.S. Pat. No. 6,997,327 describes a partial solution involving ion exchange nonwovens combined with SAP polymers to deal with the polar and inorganic species which have ionic character.

Another issue of the same nature is that the common FSII anti-icing additive DIEGME is a polar organic molecule as is Biodiesel which is also known as FAME (Fatty Acid Methyl Ester) in the trade. Biodiesel contaminants are commonly introduced into jet fuels in the form of fatty acid methyl ester (FAME) contamination as a result of pipeline transport of biodiesel blends and tail-back phenomenon causing transfer to adjacent or subsequent jet fuel batches. In addition, DIEGME FSII is a common additive to military and arctic aviation fuels worldwide. Currently, all commercial aviation fuel filter monitors sold today rely on SAP technology and possess clear labeling indicating they are incompatible with FSII and DIGEME. This is because exposure of fuel filter monitors to fuel containing FSII can degrade or eliminate their water slug resistance. In addition, there have been several reports of migration of soluble SAP contamination into down stream fuel systems in the presence of fuel containing FSII. Reports range from observation of "apple jelly", a brown discoloration of fuel treated by monitors to isolation of particles or a gel like substance, identified by chemical analysis as SAP, from FSII contaminated fuel processed through monitors. This contamination has been linked to reported flameouts of jet turbine engines related to clogging of orifices by solubilized SAP particulate from fuel filter monitors which had passed or migrated into the aircraft fuel tanks.

Finally, another drawback of the current fuel filter monitors is that due to swelling of the SAP polymer their performance degrades with progressive water removal. Ultimately resulting in a product which is single-use and which has insufficient permeability for reuse after exposure to water. This results in downtime in applications until such time as the filter monitor can be replaced. Finally, the foreshortened lifetime of filter monitor is an additional burden on the environment due to the generated waste from a filter that must be disposed of prior to fulfilling the filter's expected in use lifetime.

Therefore, it is an object of this invention to address these long-felt needs for a fuel filter monitor which overcomes the aforementioned drawbacks. Specifically, a fuel filter monitor which exhibits improved flow stoppage when challenged with a water stream or slug, particularly when the fuel or water is contaminated with a polar compound. Furthermore, it is an object of the present invention to produce a fuel filter monitor which does not contribute to deleterious and dangerous migration of nonfibrous filter media, in particular SAP particles and solutes, to the fuel down stream of the monitor. Still another object is to produce a fuel filter monitor that can be reused after stopping flow during challenge with water stream or slug.

SUMMARY OF THE INVENTION

It has been discovered that the function of a fuel filter monitor can be accomplished without the use of SAP. The present invention provides a fuel filter monitor comprising an ePTFE membrane, a support structure adjacent to said ePTFE membrane wherein the membrane is disposed upstream of the support and said monitor prevents penetration of water to the downstream of said fuel wet monitor, where the water can be in the form of discrete water drops in the fuel, or a bulk water stream which displaces the upstream fuel. Furthermore, it has been discovered that said monitor stops fluid flow when challenged with a bulk water stream even in fluid streams contaminated with polar compounds.

The fuel filter monitor is particularly useful for filtering and removing water and other solids from a fuel stream such as petrol, gasoline, hydraulic fluid, dielectric fluid, diesel fuel, or jet fuel. Even more particularly, when the fuel stream contains polar contaminants like biodiesel or DIEGME icing inhibitor.

DETAILED DESCRIPTION OF THE INVENTION

The invention includes the fuel filter monitor, the composition of the media, and method(s) of using the fuel filter monitor in fuel streams including articles comprising the media and applications of commerce.

Figure 1:
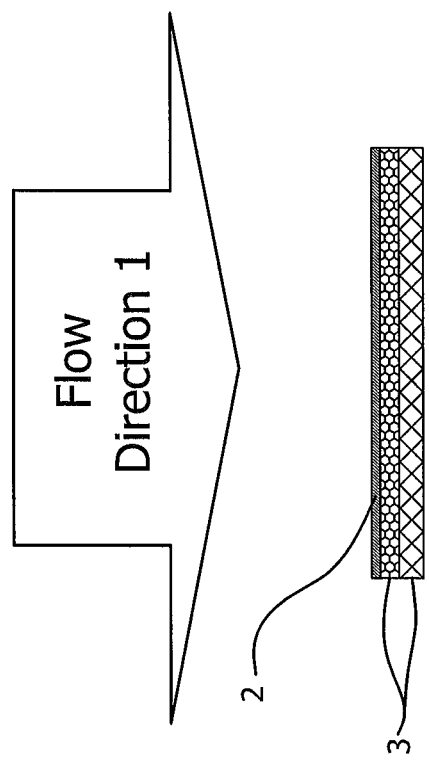
FIG. 1 is a side cross-sectional view of an exemplary embodiment of the present invention.

FIG. 1 depicts one representative embodiment of the inventive fuel filter monitor. As seen in FIG. 1, present invention provides a fuel filter monitor affixed in a fuels stream flowing in the direction indicated by the arrow (1) from upstream to downstream. The inventive fuel filter monitor is comprised by an ePTFE membrane (2) upstream of a support structure comprised of woven or nonwoven layers (3) wherein the support structure is adjacent to said ePTFE membrane (2) and wherein the membrane is disposed upstream of the support and wherein said monitor prevents penetration of water to the downstream of said fuel wet monitor, where the water can be in the form of discrete water drops in fuel, or a bulk water stream which displaces the upstream fuel. In this particular embodiment the support structure is comprised of two layers of non-woven, respectively and has a total thickness less than 0.5 mm.

Figure 2:
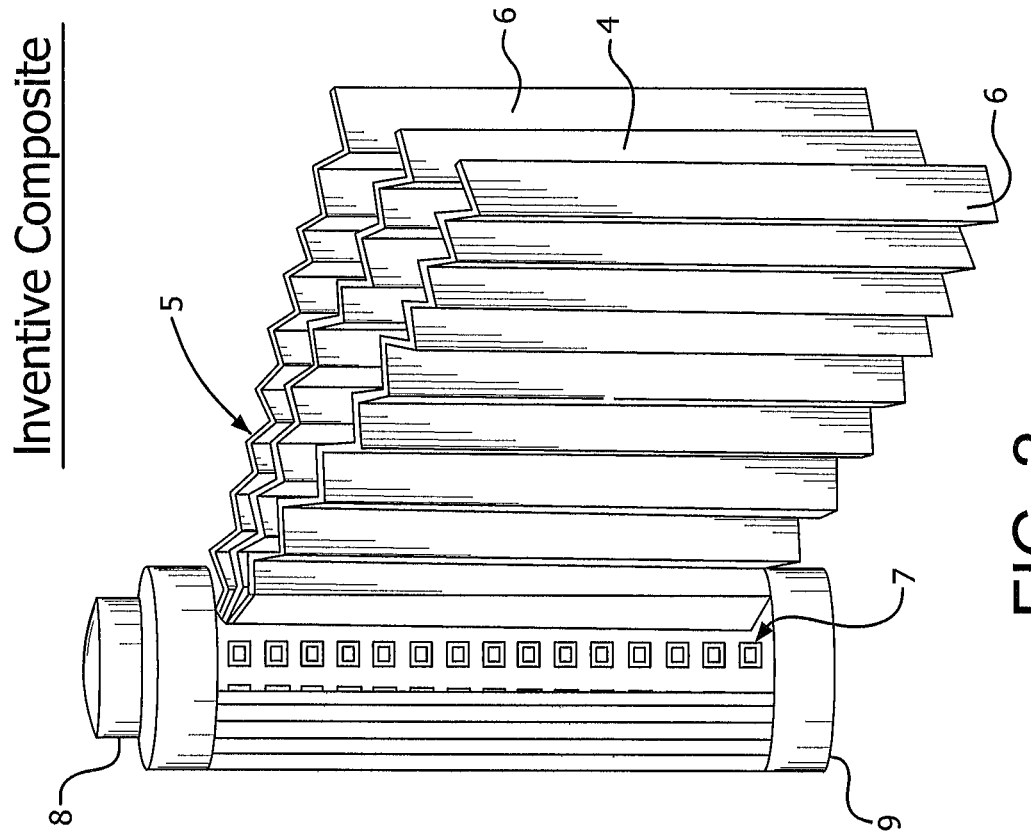
FIG. 2 is an illustration of another exemplary embodiment of the present invention in a pleated element form.

FIG. 2 depicts another embodiment of the inventive fuel filter monitor. Here the ePTFE membrane (4), is pleated (5) between layers of nonwoven (6), where one layer of the nonwoven (6) and a plastic core (7), are disposed downstream of the ePTFE and serve as a support. Herein the pleat pack of ePTFE and non-wovens are disposed radially about the tubular plastic support. The pleat pack is seam sealed and potted into the end caps, the open end cap (8) and the blind bottom end cap (9), so as to provide an integral filter element suitable for inside out flow. The inventive monitor owing to its thinner media as assembled has a filter area of ~2000 cm$^2$ per 6 inch length at a 2 inch outer diameter, as compared to the prior art incumbent filter monitor which has less than 300 cm$^2$ at the same volume.

Figure 3:
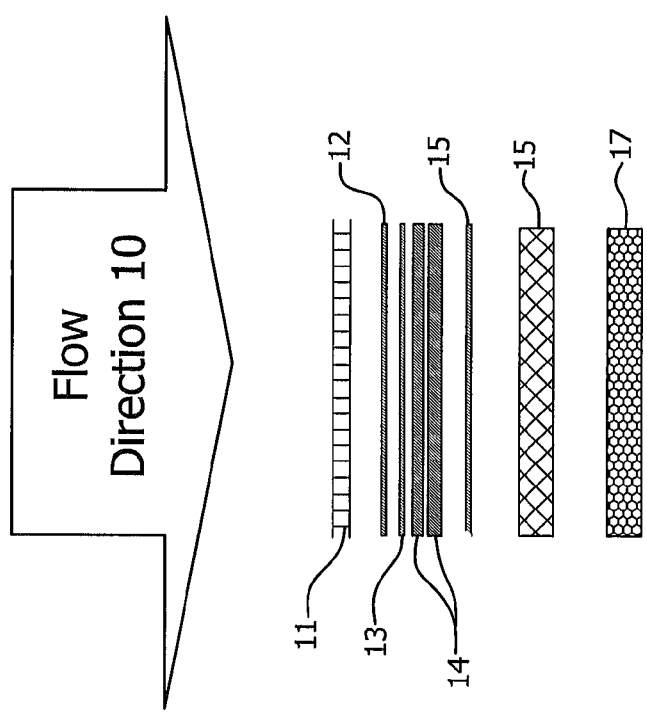
FIG. 3 is a side cross-sectional view of an exemplary embodiment of the prior art fuel filter monitor.
Figure 4:
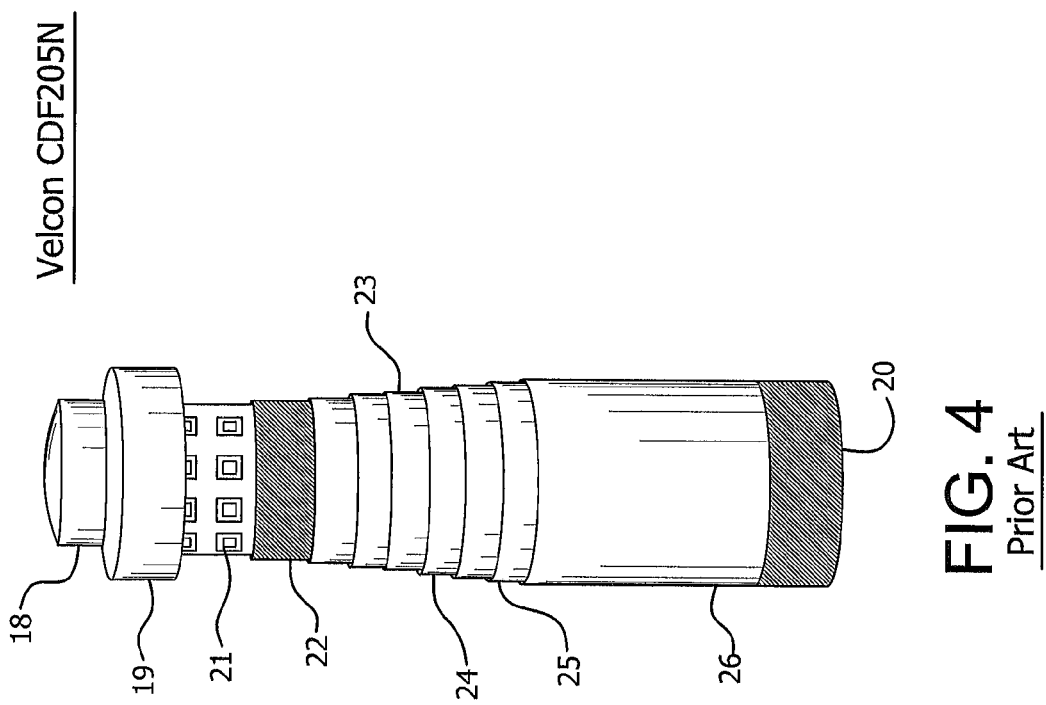
FIG. 4 is an illustration of an exemplary embodiment of the prior art of a typical commercial fuel filter monitor element.

FIG. 3 and FIG. 4 depict embodiments common to the prior-art SAP based fuel filter monitors. Typical commercial SAP containing monitors often comprise 7, 8, or more subsequent layers and are often several millimeters thick. FIG. 3 depicts the general construction of a Velcon CDF205 N (CDF=Clean Dry Filter) commercial fuel filter monitor containing SAP polymer, the arrow (10) depicts the flow direction. The Velcon CDF205 N filter comprises subsequent layers of a woven outer sock (11), a nonwoven paper layer (12), a nonwoven layer (13), SAP containing nonwovens (14), nonwoven layers (15), and a thick support nonwoven (17) These layers comprise of ~3 mm thickness which illustrates another advantage of the inventive fuel filter monitor which is that it is substantially thinner and less complicated. FIG. 4 shows the cylindrical construction of a typical commercial fuel filter monitor seam sealed and potted in a filter element. Wherein, the element is comprised of the o-ring (18), on the open end cap (19), the blind end cap (20) and the various filters layers with support structure. The layers start with the rigid plastic support tube/core (21), followed by a high strength small pore size non-woven layer (22), water absorbent SAP layers (23), a support scrim (24), various nonwoven filter layers (25), and outer sock (26) The filter area for a typical element of ~6 inch length as depicted is 200 cm^2. Comparison of FIG. 4 to FIG. 2 illustrates yet another advantage of the inventive monitor which is that due to its lower inherent thickness the inventive monitor allows for a pleated construction comprising more area in the same volume space.

ePTFE membranes suitable for this invention include those produced by process described in U.S. Pat. No. 7,306,729, and U.S. Pat. No. 4,902,423, U.S. Pat. No. 3,953,566. Preferred are ePTFE membranes and composites thereof described in U.S. Pat. No. 7,306,729.

Suitable support structures include single and multilayer constructs wherein the layers may comprise nonwoven materials, porous or microporous membranes, woven materials, and screens produced by machining, perforation, or their processes. The membrane or support structures can take the embodiment of flat sheets, or other 3d shapes so long as the membrane is in contact with the support structure. Optionally, the membrane may be fixed or bonded to the support structure mechanically, by adhesive at the edges, across the surface uniformly, or discretely as in a laminate. Herein nonwoven materials include a body or mat comprised of a plurality of fibers, fine fibers, microfibers, nanofibers, or a mixture thereof wherein the volume of the body is comprised of regions of both solid and gas.

Materials suitable to serve as a "support structure" also include woven textiles, perforated screens of metal or plastic, and porous sintered plastics metals, or ceramics. In addition the support structure wherein the comprising material has a Mullen burst pressure >50 psi. Support structures with Mullen burst pressure >75 psi are preferred, and >100 psi are most preferred. Furthermore, the support structures have average pore openings such that they fulfill the relation pore radius less than 500 microns, more preferably less than 250 microns, and most preferably less than 10 microns.

Materials suitable to serve as a "porous nonwoven filter media" can be any porous non-woven material of organic or inorganic composition. If the non-woven is fibrous, microfibrous, nanofibrous it can contain other materials besides the fibers including fillers, binders, coatings, and/or lubricious coatings including, but not limited to those comprised of silicone or fluoropolymer dispersions. Suitable non-wovens include synthetic polymer, natural polymer, and inorganic or glass fibers. They can fall into the general classifications of nonwovens including, but not limited to, meltblown materials, spunbond materials, wet laid materials, electromeltblown materials, electrospun materials, and composites thereof. These nonwovens can be produced and processed by methods including, but not limited to, melt extrusion, melt extrusion with air jets, solvent spinning, towing of fibers and yarns, carding, needle punching, hydroentanglement, fibersplitting, wetlaying, drylaying, paste extrusion, perforation, stretching, and other means known to skilled practitioners in the arts of non-woven production.

EXAMPLES

Testing Methods

Interfacial Tension Measurement

Interfacial tension of test fuels against water was measured using Kruss K12 hardware bios version 4.04 running the Kruss Laboratory Desktop Software version 2.0.0.2207 using the DuNoy Ring Pull Method. DuNoy ring immersions were conducted with flamed Kruss standard platinum ring and the software default dip parameters, except that the measuring speed was set to 1 mm/min. RO Deionized water which had 18 MΩ resistivity from a MIlliQ system was used for these tests.

Thickness Measurements

Thickness of the samples was taken using a thickness snap gauge Kafer FZ1000/30 or equivalent.

Airflow Measurements

The airflow through the membranes and nonwovens was measured using a gas flow measurement system ATEQ D520 Gas flow leak tester version 1.00 (ATEQ LES CLAYES SOUS BOIS—France). The ATEQ was attached to a sample fixture which pneumatically seals an o-ring to a 1.92 cm diameter circular area of 2.9 cm² on a support screen. Airflow is then recorded in L/hr at a differential pressure of 0.174 psi (12 millibar). Airflow measured this way can be converted to other common units of measurement using the relation 164.6467/(L/hr ATEQ Value)=Gurley Second Value and Gurley Second Value=3.126/Frazier number.

Bubble Point and Pore Size Measurements

The bubble point and mean flow pore size were measured according to the general teachings of ASTM F31 6-03 and ASTM E1294 using a Capillary Flow Porometer (Model CFP 1500 AEXL from Porous Materials Inc., Ithaca, N.Y.). The sample membrane was placed into the sample chamber and wet with SilWick Silicone Fluid (available from Porous Materials Inc.) having a surface tension of 19.1 dynes/cm. The bottom clamp of the sample chamber had a 2.54 cm diameter, 3.175 mm thick porous metal disc insert supplied with the instrument (Porous Materials Inc., Ithaca, N.Y., ~20 micron MFP based on the instrument) and the top clamp of the sample chamber was supplied by the manufacturer had a ¼ inch diameter hole. Using the Capwin software version 6.74.70 the following parameters were set as specified in the table immediately below.

| Parameter | Set Point |
| --- | --- |
| maxflow (cc/min) | 200000 |
| bulbflow (cc/min) | 30 |
| F/PT (old bubltime) | 50 |
| minbppres (PSI) | 0 |
| zerotime (sec) | 1 |
| v2incr (cts) | 10 |
| predinc (cts) | 1.25 |
| Pulse delay (sec) | 2 |
| maxpre (PSI) | 500 |
| pulse width (sec) | 0.2 |
| mineqtime (sec) | 30 |
| presslew (cts) | 10 |
| flowslew (cts) | 50 |
| eqiter | 97 |
| aveiter | 20 |
| maxpdif (PSI) | 0.1 |

-continued

| Parameter | Set Point |
|---|---|
| maxfdif (cc/m) | 50 |
| sartp (PSI) | 1 |
| sartf (cc/min) | 500 |

Viscosity Measurement

Viscosity was measured using a Brookfield DVII+ viscometer with a UL low volume spindle and tube accessory or other accessory. Viscosities are reported in centipoise (cP) for a temperature of 22.5 degrees Celsius, at 100 RPM, Viscosities were read after five minutes at 100 RPM for samples which had previously been run at the maximum RPM allowed by torque.

Burst Pressure Measurement

The Mullen's burst test (Federal Std. 191A, Method 5512) is performed in the following manner. The test consists of clamping a test specimen in a fixture, applying glycerol under pressure against the inner surface, and visually observing the outward facing surface of the specimen until the specimen ruptures (Burst). The pressure at which these events occur is recorded.

Density Measurements and Porosity Calculations

Samples die cut to form rectangular sections 2.54 cm by 15.24 cm were measured to determine their mass (using a Mettler-Toledo analytical balance model AG204) and their thickness using a the Kafer FZ1000/30 thickness snap gauge. Using these data, density was calculated with the following formula:

$$\rho = \frac{m}{w*l*t}$$

in which: $\rho$=density (g/cc); m=mass (g); w=width (cm); l=length (cm); and t=thickness (cm). The average of the three measurements was used.

Porosity is expressed in percent porosity and was determined by subtracting the quotient of the average density of the article (described earlier herein) and that of the bulk density of PTFE from 1, then multiplying the value by 100%. For purposes of this calculation, the bulk density of PTFE was taken to be 2.2 g/c Tensile Break Load Measurements and Matrix Tensile Strength (MTS) Calculations Tensile break load was measured using an INSTRON 1122 tensile test machine equipped with flat-faced grips and a 0.445 kN load cell. The gauge length was 5.08 cm and the cross-head speed was 50.8 cm/min.

The sample dimensions were 2.54 cm by 15.24 cm. For longitudinal MTS measurements, the larger dimension of the sample was oriented in the machine, or "down web," direction. For the transverse MTS measurements, the larger dimension of the sample was oriented perpendicular to the machine direction, also known as the crossweb direction. Each sample was weighed using a Mettler Toledo Scale Model AG204, then the thickness of the samples was taken using the Kafer FZ1000/30 thickness snap gauge. The samples were then tested individually on the tensile tester. Three different sections of each sample were measured. The average of the three maximum load (i.e., the peak force) measurements was used. The longitudinal and transverse MTS were calculated using the following equation: MTS= (maximum load/cross-section area)*(bulk density of PTFE)/density of the porous membrane), wherein the bulk density of PTFE is taken to be 2.2 g/cc. Measurements were conducted at ambient pressure, relative humidity, and room temperature. Generally, this was 1 atmosphere, 25% relative humidity, and 21° C.

Porosity was expressed in percent porosity and was determined by subtracting the quotient of the average density of the article (described earlier herein) and that of the bulk density of PTFE from 1, then multiplying that value by 100%. For the purposes of this calculation, the bulk density of PTFE was taken to be 2.2 g/cc.

High Flow Rate Water Stream Challenge

Figure 5:
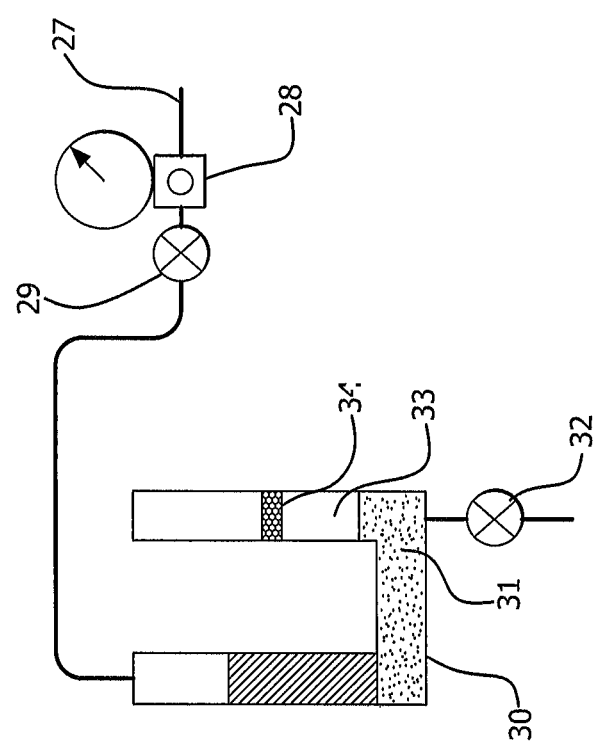
FIG. 5 is schematic diagram illustrating the high flow water stream test apparatus.
Figure 6:
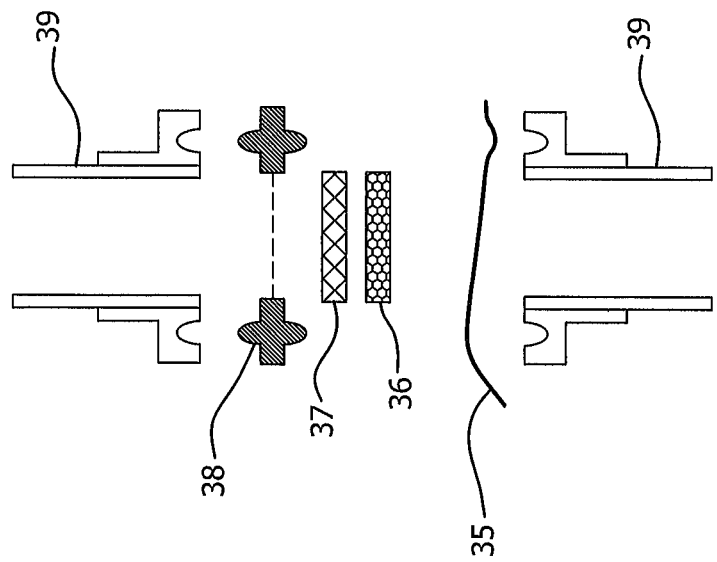
FIG. 6 is schematic diagram of the inventive sample mounting configuration in the high flow water stream test apparatus.
Figure 7:
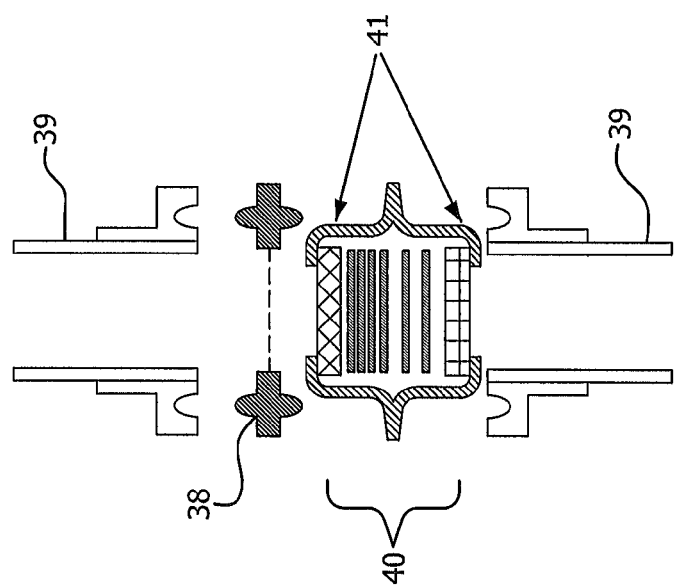
FIG. 7 is schematic diagram of the prior art sample mounting configuration in the high flow water stream test apparatus.

Following the teachings of EI1583 a necessary qualification for a fuel filter monitor is to stop flow and prevent water penetration when in the course of filtering a fuel stream at a relatively high flow rate at or near the maximum flow rate of the element, that stream is suddenly changed to a pure water stream. This is known in the art as a water slug test at full flow. Per the teachings of EI 1583 it is sometimes desirable to perform this test at a relatively high flow rate as this challenges the swelling kinetics of a sorbent filter monitor. In the spirit of these teachings we have devised a lab-scale test to challenge discrete disc samples of fuel filter monitor media. For these purposes we have assembled the apparatus depicted in FIG. 5. The instrument was comprised by a compressed gas supply (27), controlled by a pressure regulator with a pressure gauge for read out (28), followed by a ball valve for instant pressure introduction to initiate a water slug (29), a U shaped tube to provide for a fuel column supported by a water column (30), a drain valve (31), a water column (32), on which a fuel column rested (33), a test sample immersed in fuel and supported by a perforated metal screen (34). Briefly the U-tube was created and filled with water, and a fuel layer was rested on the water in one leg of the U that was constructed of transparent material. In this transparent leg a sample was mounted on a support screen as depicted in FIG. 6 for inventive composites or FIG. 7 for the prior-art. FIG. 6 shows the details of the sample mounting for the inventive composite. Specifically an ePTFE membrane (35), was supported on a layer of Reemay M 2275 polyester spunbond (36), in turn resting on a layer of typar 3151 spunbond (37), resting on a support screen (38) [1⅜ diameter stainless steel metal support screen, 0.5 mm thick, with 490×0.033 in diameter holes, spaced equal distance apart, in a square array, encased in a 1.5" viton sanitary gasket GVC direct PN 40 MPVP150-0.033SS].

Where the above stack was sealed by clamping between the flanges of two a transparent polysulfone sanitary sight glasses (39) [GVC direct PN 24PSSG-6]. FIG. 7 shows the details of sample mounting for the prior art composite. For these tests the multilayer sample stack (40) was heat sealed at the edges using a dyneon THV 220 gasket (41) and sealed by clamping the support screen (38) between the flanges of two a transparent polysulfone sanitary sight glasses (39). The fuel layer was raised by water addition to the opposite leg until the test sample was wet by and immersed in fuel. The regulator (28) was used to generate an 80 to 100 psi gas pressure behind a valve (29) feeding a line to the water filled leg of the U tube (31) without fuel. The setup was imaged by video recording and the valve after the gas pressure regulator (29) was opened. This instantly applied pressure to the water column and drove fuel through the membrane, impacting the membrane with a water "slug" at high pressure of at least 100 psi. For some tests opaque SS sanitary flanged tubes were used instead of transparent. For these tests, water passage was determined by decanting the downstream liquid after the test. Fuel and any visible water were separated using a separatory funnel and quantified gravimetrically based on the fluid densities and reading from an analytical balance. Flow rates of liquid were determined based on visual observation of the water column movement for transparent tubes or based upon observation of the start or cessation of displaced gas determined via visual observation of bubbling on the outlet tube immersed in a beaker for the opaque tube. Typical flow rates during the EI 1583 test are ~1320 L/h per 6 inch length fuel filter monitor element. This suggests a flux of 66,000 L/m$^2$ h (Area ~0.02 m$^2$) for conventional monitors and 6600 L/m$^2$ h (Area ~0.2 m$^2$) for the inventive monitors. The effective filter area in this test is 0.0005 m$^2$. Therefore, scaled flow rates of ~24-33 L/h for conventional monitors and ~3.3-5 L/h for the inventive monitors would be expected in this lab test. Based on visual observation of speed of movement of the fuel column, flow rates consistent with these ranges were obtained in the test here. For these tests the challenge fuel used was contaminated with polar organic compounds to simulate the common field contaminant scenarios of standard jet fuel with antistatic and corrosion inhibitors, jet fuel with biodiesel contaminant, or jet fuel with FSII contaminant. The test fuel used was produced from clay-treated jet fuel (Jet A, 2 cp, 0.82 g/ml, fuel water IFT=39 mN/m). To simulate standard EI1583 test fuel it was blended with a corrosion inhibitor DCI4A (DCI-4A—Part #10151, Innospec Fuel Specialties LLC) at 1 mg/L and Stadis 450 (Stadis 450-Part #10101, Innospec Fuel Specialties LLC) at 15 mg/L The standard EI 1583 test jet fuel had an IFT of water of 33.5 mN/m. To simulate polar contaminants the fuel was blended with 1 wt % biodiesel (Soy gold SG1000, viscosity, 4.5 cP @ 25° C., density of 0.882 g/mL @ 25° C., fuel water IFT=10 mN/m) or with 2 wt % DIEGEME (DIEGME—Part #579548, Sigma-Aldrich Co. LLC). The JET A and 1 wt % biodiesel blend had a fuel water IFT of 28 mN/m. The JET A and DIEGME fuel had a fuel water IFT of 35 mN/m. Water for the tests was reverse osomosis purified and had a surface tension of 72 mN/m.

Low Flow Rate Water Stream Challenge

Following the teachings of EI 1583 a necessary qualification for a fuel filter monitor is to stop flow and prevent water penetration when in the course of filtering a fuel stream at a relatively low flow rate (~10% of the maximum flow rate of the element) when the fuel stream is suddenly changed to a pure water stream. This is known in the art as a water slug test at 10% rated flow. The purpose of this test is again to challenge the swelling kinetics of the SAP polymer in a conventional fuel filter monitor. For this test the apparatus described in FIG. 8 was assembled. Briefly a progressive cavity pump (45) with viton seals (Moyno MO3095596, model 33101 with a variable speed controller and drive baldor VS1m×10p5-2) was plumbed in-line upstream of a Gammon Technologies GTP SK-853 housing (46) [this housing is designed for a 2" od by 6" length fuel filter monitor]. Upstream of the pump was a three-way valve (47) allowing the pumps feed to be switched between a 5 L fuel sump (48) and a 5 L water sump (49). Downstream of the monitor housing was another three-way valve (47) allowing the fuel passing the filter monitor to be diverted from the recirculation loop to a separate collection vessel (50). Pressure sensors (51) [Scilog Scipres series] placed up and downstream of the fuel filter monitor housing and the filter differential pressure was recorded via a Scipress monitor into MS-Excel using a PC running WinWedge software. A valve was attached off of the upstream of the monitor housing (52) allowing the upstream volume of the filter housing to be drained or exchanged. To accomplish a test, fuel was flowed through 6 inch monitor elements at a flow rate of 2 L/min which is ~10% of the full rated flow of monitors of this diameter and length. The test fuel used was produced from clay treated jet fuel (Jet A, 2 cp, 0.82 g/ml, fuel water IFT=39 mN/m). To simulate polar contaminants the fuel was blended with 2 wt % DIEGME (DIEGME—Part #579548, Sigma-Aldrich Co. LLC). The JET A and DIEGME fuel had a fuel water IFT of 35 mN/m. Water for the tests was Deionized water with 18 MO resistance from a MilliQ system. Fuel was recirculated through the test filter element for 30 minutes prior to water introduction. Then both the valve upstream of the pump and downstream of the filter were simultaneously switched to feed pure water to the filter and to collect all fluid passing the filter. The pump was stopped when pressure was observed to spike >40-70 psi. The pump was restarted to simulate pulsing and creating a pressure spike. This process was repeated a total of 6 or 7 times to simulate the impact of pressure spikes on water penetration. The test filter housing was inverted to decant downstream fuel and any water which had passed the filter into the collection vessel. The water and fuel were separated using a separatory funnel and quantified gravimetrically using a balance based on density. The three way valves upstream of the pump and down stream of the filter monitor were then returned to their original positions. Water was then drained from the upstream of the test filter housing drain valve with the pump restarted, forcing water to exit the upstream of the filter housing. The drain valve was then closed and subsequent pressure drop and flow was monitored. If the pressure was observed to spike the pump was shut down. If the pressure drop was low the filter was allowed to equilibrate in flow and the water slug test described above was repeated.

Sample Materials

Example 1

Figure 9:
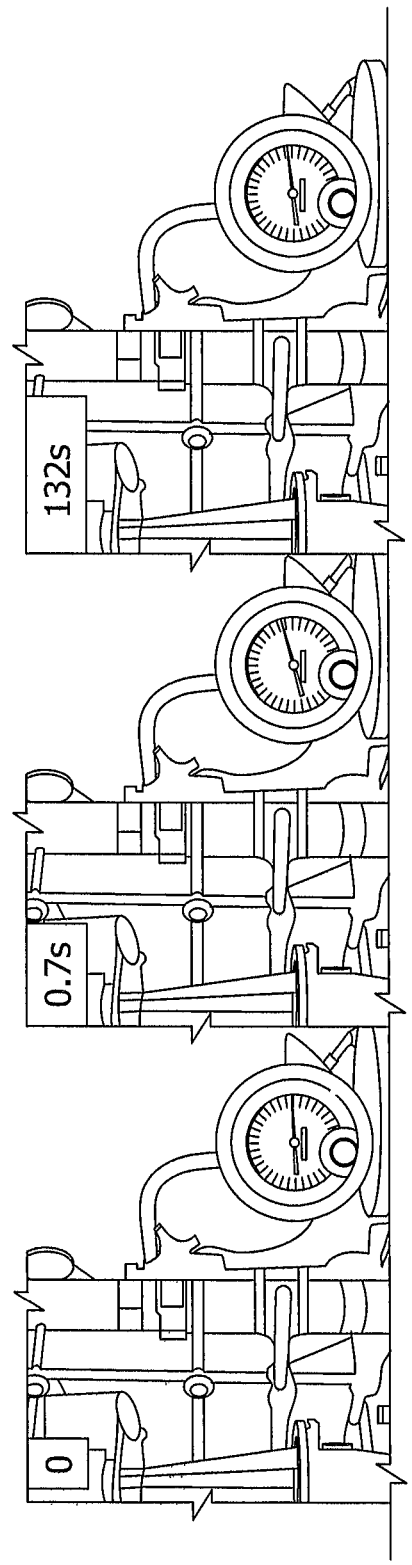
FIG. 9 are three time lapse pictures of the high flow water stream test on an inventive filter monitor illustrating the arrest of a water slug, with no water passage and clear fuel free of turbid particulate.

A three layer composite ePTFE membrane was made by processes described in U.S. Pat. No. 7,306,729. The membrane had an average matrix tensile strength of 14738 (PSI), an ATEQ airflow of 56.3 L/h, a bubble point of 50.079 psi, a porosity of 82%, a thickness of 2.5 mil, mass/area of 25.6 g/m$^2$, and pore size of 0.142 microns. The membrane above was mounted on a non-woven support as shown in FIG. 6. The support non woven comprised two layers, one layer of Fiber Web Typar 3151 a Spunbond Nonwoven, with a basis weight of 54 g/m$^2$, 0.3 mm thickness, and a Mullen burst pressure of 58 psi and one layer of Fiber Web Reemay 2275 a polyester spunbond with a basis weight of 25 g/m$^2$, a 0.2 mm thickness, and a Mullen burst pressure of 83 psi. Typar 3151 has a manufacturer reported sieving pore size or opening size (by ASTM D4751 of 840 microns. The mullen burst pressure of the Reemay 2275 on top of the Typar 3151 as in the test configuration was measured at 143 psi. For purposes of the test 1⅜ inch diameter disks were die cut and placed under the ePTFE membrane as shown in FIG. 6. The membrane was then wet by fuel by adding water to the opposite leg of the test apparatus from the mounted membrane to raise a fuel layer through the membrane. This resulted in a membrane immersed in a fuel column, where the fuel column rested on a water column. A 100 psi gas pressure was instantly applied to the water column with the regulator using the switching valve (29) in FIG. 5 effectively driving the water column into the fuel wet membrane at a high flow rate. The water flow was observed to stop instantly on reaching the membrane resulting in a gauge measured pressure which stabilized at 100 psi. All flow was observed to stop when the water column reached the membrane. This test was repeated three times on different samples. With no observable flow after the water layer reached the membrane and no visible water passage into the fuel downstream of the membrane. FIG. 9 shows video frame captures from the above highflow water stream challenge test Example 2

The ePTFE membrane of example 1, was mounted on a nonwoven support as shown in FIG. 6. The support non woven comprised two layers, one layer of Fiber Web Typar 3151 a Spunbond Nonwoven, with a basis weight of 54 g/m$^2$, 0.3 mm thickness, and a Mullen burst pressure of 58 psi and one layer of Fiber Web Reemay 2275 a polyester spunbond with a basis weight of 25 g/m$^2$, a 0.2 mm thickness, and a Mullen burst pressure of 83 psi. The Mullen burst pressure of the Reemay 2275 on top of the Typar 3151 as in the test configuration was measured at 143 psi. For purposes of the test 1⅜ inch diameter disks were diecut and placed under the ePTFE membrane as shown in FIG. 6. The membrane was then wet by Jet fuel containing 2% DIEGME by adding water to the opposite leg of the test apparatus from the mounted membrane to raise a fuel layer through the membrane. This resulted in a membrane immersed in a column of jet fuel containing 2% DIEGME, where the fuel column rested on a water column. A 100 psi gas pressure was instantly applied to the water column with the regulator using the switching valve (29) in FIG. 5 effectively driving the water column into the fuel wet membrane at a high flow rate. The water flow was observed to stop instantly on reaching the membrane resulting in a gauge measured pressure which increased to a peak of 100 psi. After the fluid downstream of the membrane was decanted, producing only clear and bright fuel with no visible or quantifiable water passing the membrane.

Example 3

The ePTFE membrane of example 1, was mounted on a nonwoven support as shown in FIG. 6. The support non woven comprised two layers, one layer of Fiber Web Typar 3151 a Spunbond Nonwoven, with a basis weight of 54 g/m$^2$, 0.3 mm thickness, and a Mullen burst pressure of 58 psi and one layer of Fiber Web Reemay 2275 a polyester spunbond with a basis weight of 25 g/m$^2$, a 0.2 mm thickness, and a Mullen burst pressure of 83 psi, and an apparent opening size of 0.840 mm by ASTM D4751. The Mullen burst pressure of the Reemay 2275 on top of the Typar 3151 as in the test configuration was measured at 143 psi. For purposes of the test 1⅜ inch diameter disks were diecut and placed under the ePTFE membrane as shown in FIG. 6. The membrane was then wet by Jet fuel containing 1 wt % Soy Gold Biodiesel by adding water to the opposite leg of the test apparatus from the mounted membrane to raise a fuel layer through the membrane. This resulted in a membrane immersed in a column of jet fuel with 1 wt % soy gold biodiesel content, where the fuel column rested on a water column. A 100 psi gas pressure was instantly applied to the water column with the regulator using the switching valve (29) in FIG. 5 effectively driving the water column into the fuel wet membrane at a high flow rate. The water flow was observed to stop instantly on reaching the membrane resulting in a gauge measured pressure which increased to a peak of 100 psi. After the fluid downstream of the membrane was decanted producing only clear and bright fuel with no visible or quantifiable water passing the membrane.

Example 4

Figure 10:
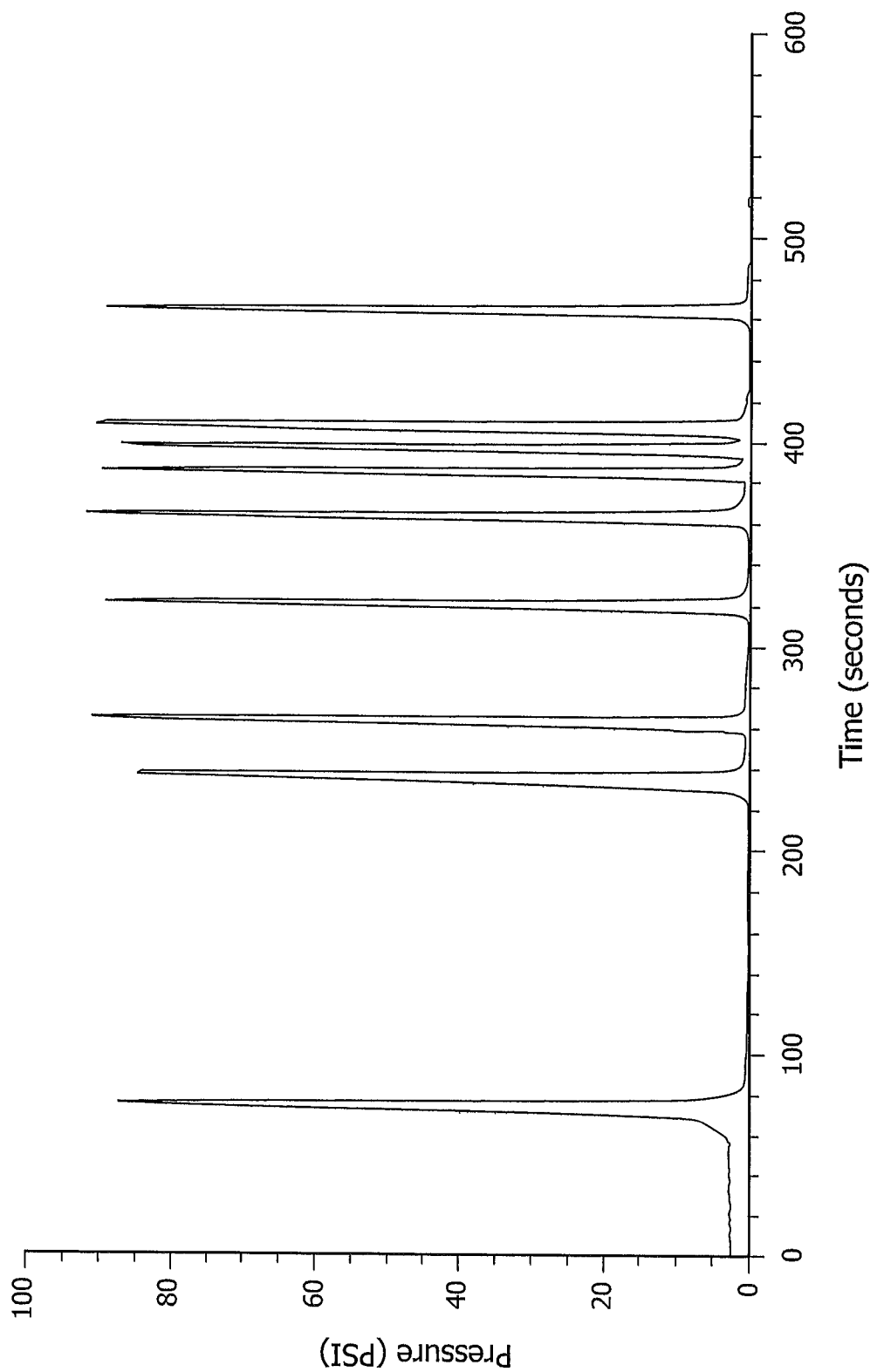
FIG. 10 is a trace of the differential pressure across the embodiment of the present invention (depicted in FIG. 2) during pressure pulsation in a low flow water stream test.

The ePTFE membrane of example 1 was assembled into a filter element represented in FIG. 2. To accomplish this the membrane was pleated floating between two layers of Fiberweb Typar 3151 PP spunbond nonwoven (described above) with alternating 12 and 10 mm pleat heights. A pleat pack of 94 pleats, was seam sealed using loctite 5 minute epoxy mixed less than 10% acetone. This pleat pack was potted leaving a 101 mm length of pleat height unpotted between the caps to create the element depicted in FIG. 2. Potting was accomplished using the same 5 minute epoxy acetone described above in conductive polymer end caps in accordance with specifications described in the teachings of EI 1583 with a perforated PVC support cage with OD=1 inch and ID=0.75 inches, and 30% open area. This pleated filter element was installed in a Gammon technical products GTP SK-853 housing (for a 2" od by 6" length fuel filter monitor). The filter was primed by recirculation of Jet fuel+2% DIEGME for 30 minutes using the low flow water stream challenge set up. The element was then challenged with a water slug by switching the upstream valve 47 in FIG. 8 from fuel to water feed and the downstream valve 47 in FIG. 8 to a collection vessel. Pressure was observed to rapidly rise to >90 psi in 20 seconds, as shown in pressure trace of FIG. 10 and flow was observed to stop. The pump was shut off after pressure reached >90 psi. The pump was then turned on resulting in another >90 psi pressure spike, and shut off again. This sequence was repeated for a total of 7 additional pressure spikes after the first as can be seen in the pressure trace of FIG. 10. Afterward the downstream fluid was decanted into the collection vessel. The fuel was observed to be clear and bright. A few drops of water passing the filter were separated from the fuel using a separatory funnel. The water and fuel were quantified gravimetrically yielding 450 ml of fuel and less than 1 ml of water.

Figure 8:
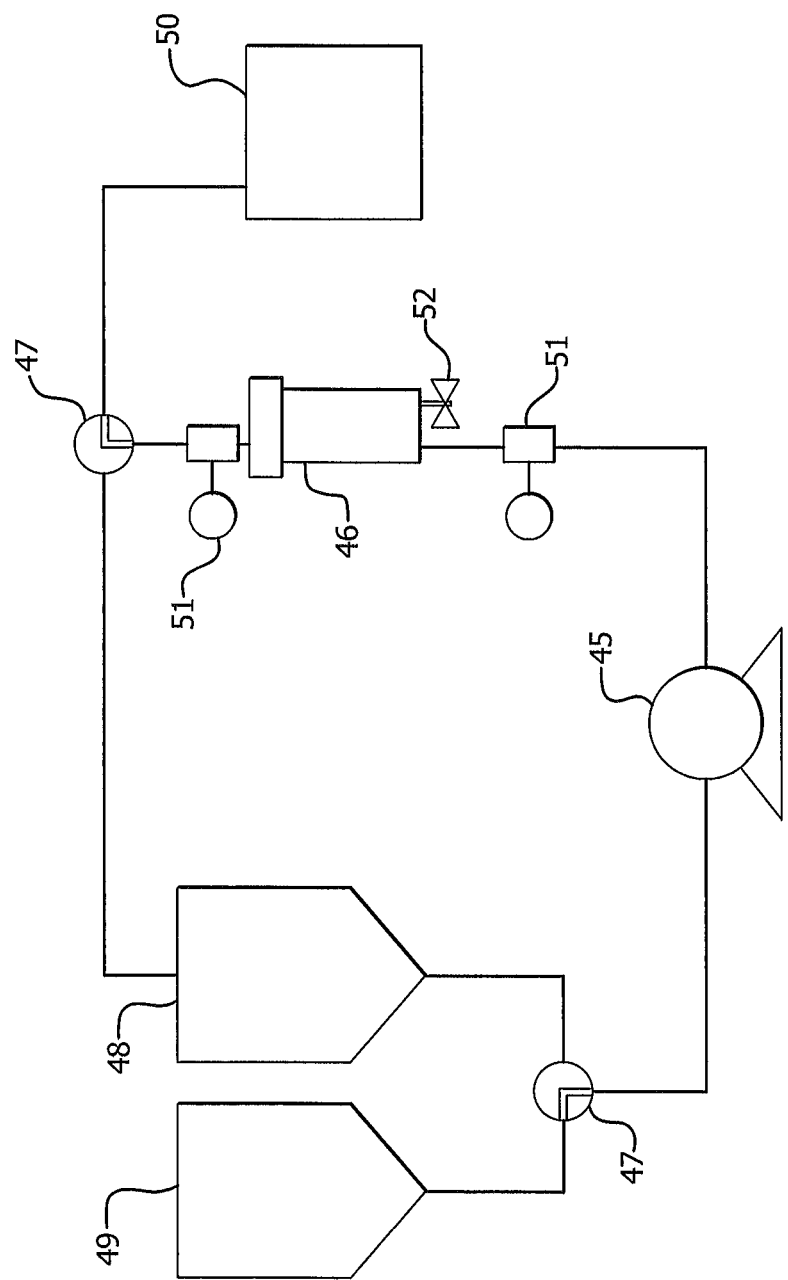
FIG. 8 is schematic diagram of the low water stream test apparatus.
Figure 11:
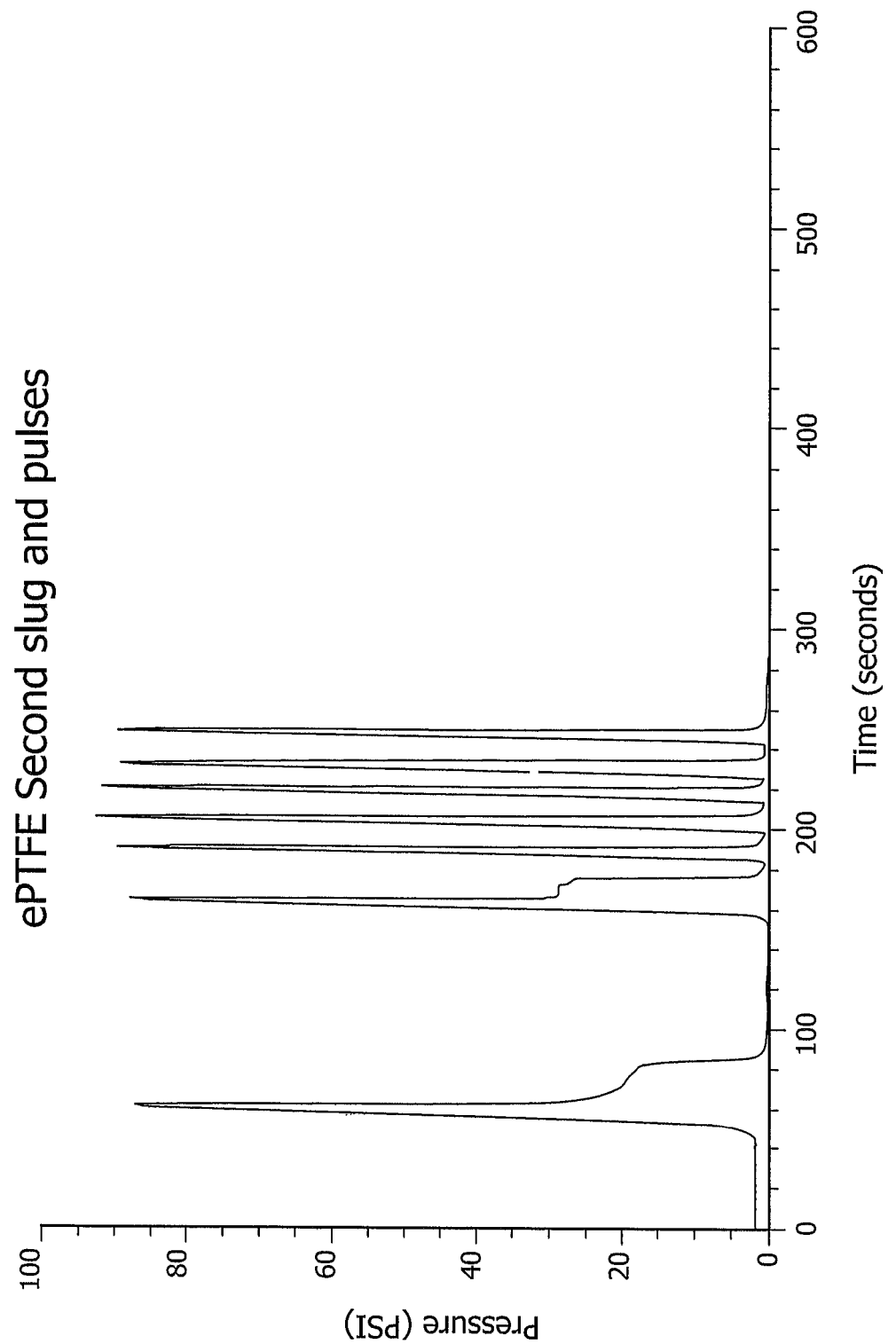
FIG. 11 is a trace of the differential pressure across the embodiment of the present invention (depicted in FIG. 2) during pressure pulsation in a low flow water stream test conducted after draining water from the housing following the test in FIG. 10.

The water was drained from the upstream of the monitor housing and the valve (52) upstream in FIG. 8 was switched to the fuel feed. Fuel was recirculated again for 30 minutes (note dP was ~1.8 psi comparable to recirculation dP before the water challenge). The element was then challenged with a water slug by switching the upstream valve 47 in FIG. 8 from fuel to water feed and the downstream valve 47 in FIG. 8 to a collection vessel. Pressure was observed to rapidly rise to >90 psi in 20 seconds, as shown in FIG. 11 and flow was observed to stop. The pump was shut off after pressure reached >90 psi. The pump was then turned on, resulting in another >90 psi pressure spike, and shut off again. This sequence was repeated for a total of 6 additional pressure spikes after the first, as seen in the pressure trace of FIG. 11. Afterward the downstream fluid was decanted into the collection vessel. The fuel was observed to be clear and bright. A few drops of water passing the filter were separated from the fuel using a separatory funnel. The water and fuel were quantified gravimetrically yielding 450 ml of fuel and less than 2 ml of water.

Comparative Example 1

Figure 12:
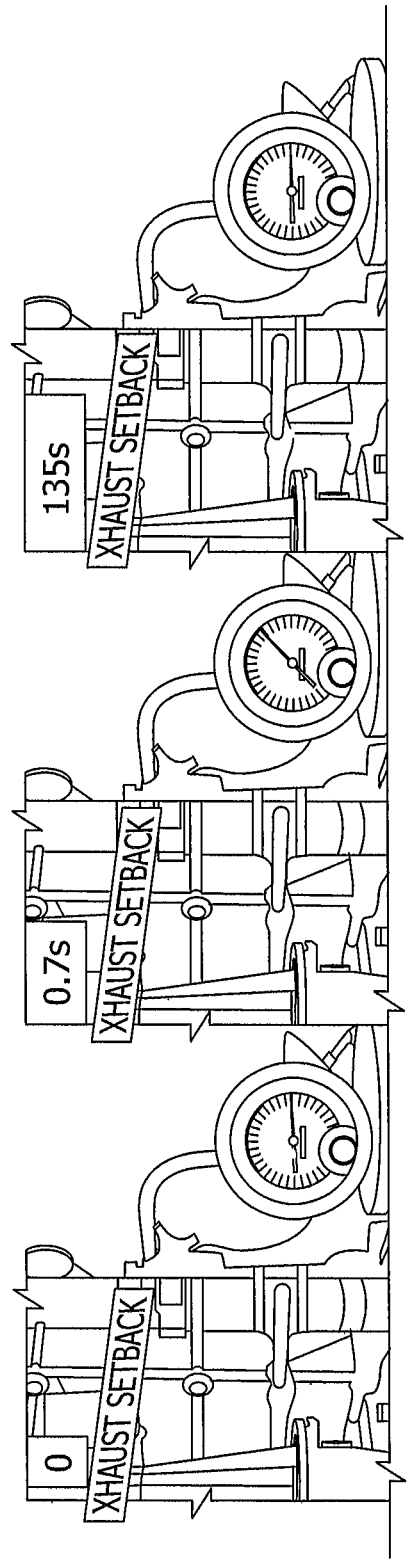
FIG. 12 are three time lapse pictures of the high flow water stream test on the prior art SAP containing fuel filter monitor media illustrating the arrest passage of water and turbid down stream fuel contaminated by particulate.

An 8 layer stack was die cut from a velcon cdf 205 n 6 inch filter monitor and with layers 1 and 8 sealed to thy gaskets and sealed together as shown in FIG. 7. The nonwoven stack was mounted with the inside face of the monitor, layer 1 of the stack mounted on a support screen in the high flow water stream test as described above. The stack was then wet by fuel by adding water to the opposite leg of the test apparatus from the mounted membrane to raise a fuel layer through the membrane. This resulted in a stack immersed in a fuel column, where the fuel column rested on a water column. A 100 psi gas pressure was created up stream using a gas flow regulator (28) upstream of valve (29) in FIG. 5, and instantly applied to the water column effectively driving the water column into the fuel wet stack at a high flow rate. The water flow was observed to slow gradually resulting in a gauge measured pressure which stabilized at 100 psi The test was repeated three times on different samples with comparable results. Flow gradually decreased to a negligible rate over t=160 s, fuel and water passing the filter appeared visibly turbid and were observed to be contaminated with SAP particles. After the test the water passing the membrane was decanted and measured with a passage of 20 ml. FIG. 12 shows video frame captures from the above highflow water stream challenge test illustrating the turbid SAP containing fuel and water layers observed downstream of the filter.

Comparative Example 2

An 8 layer stack was die cut from a velcon cdf 205 n 6 inch filter monitor and with layers 1 and 8 sealed to thy gaskets and sealed together as shown in FIG. 7. The nonwoven stack was mounted with the inside face of the monitor, layer 1 of the stack mounted on a support screen in the high flow water stream test as described above. The stack was then wet by a fuel mixture containing 2 wt % DIGEME by adding water to the opposite leg of the test apparatus from the mounted membrane to raise a fuel layer through the membrane. This resulted in a stack immersed in a fuel column, where the fuel column rested on a water column. A 100 psi gas pressure was created up stream using a gas flow regulator (28) upstream of valve (29) in FIG. 5, and instantly applied to the water column effectively driving the water column into the fuel wet stack at a high flow rate. The water flow was observed to slow gradually resulting in a gauge measured pressure which peaked at 100 psi After flow had stopped the fluid downstream of the membrane was decanted producing turbid fuel and water contaminated with particulate. The water passing the membrane was quantified as ~12 ml.

Comparative Example 3

An 8 layer stack was die cut from a velcon cdf 205 n 6 inch filter monitor and with layers 1 and 8 sealed to thy gaskets and sealed together as shown in FIG. 7. The nonwoven stack was mounted with the inside face of the monitor, layer 1 of the stack mounted on a support screen in the high flow water stream test as described above. The stack was then wet by a jet fuel mixture containing 1 wt % soygold biodiesel by adding water to the opposite leg of the test apparatus from the mounted membrane to raise a fuel layer through the membrane. This resulted in a stack immersed in a fuel column, where the fuel column rested on a water column. A 100 psi gas pressure was created up stream using a gas flow regulator (28) upstream of valve (29) in FIG. 5, and instantly applied to the water column effectively driving the water column into the fuel wet stack at a high flow rate. The water flow was observed to slow gradually resulting in a gauge measured pressure which peaked at 100 psi After flow had stopped the fluid downstream of the membrane was decanted producing turbid fuel and water contaminated with particulate. The water passing the membrane was quantified as ~16 ml.

Comparative Example 4

Figure 13:
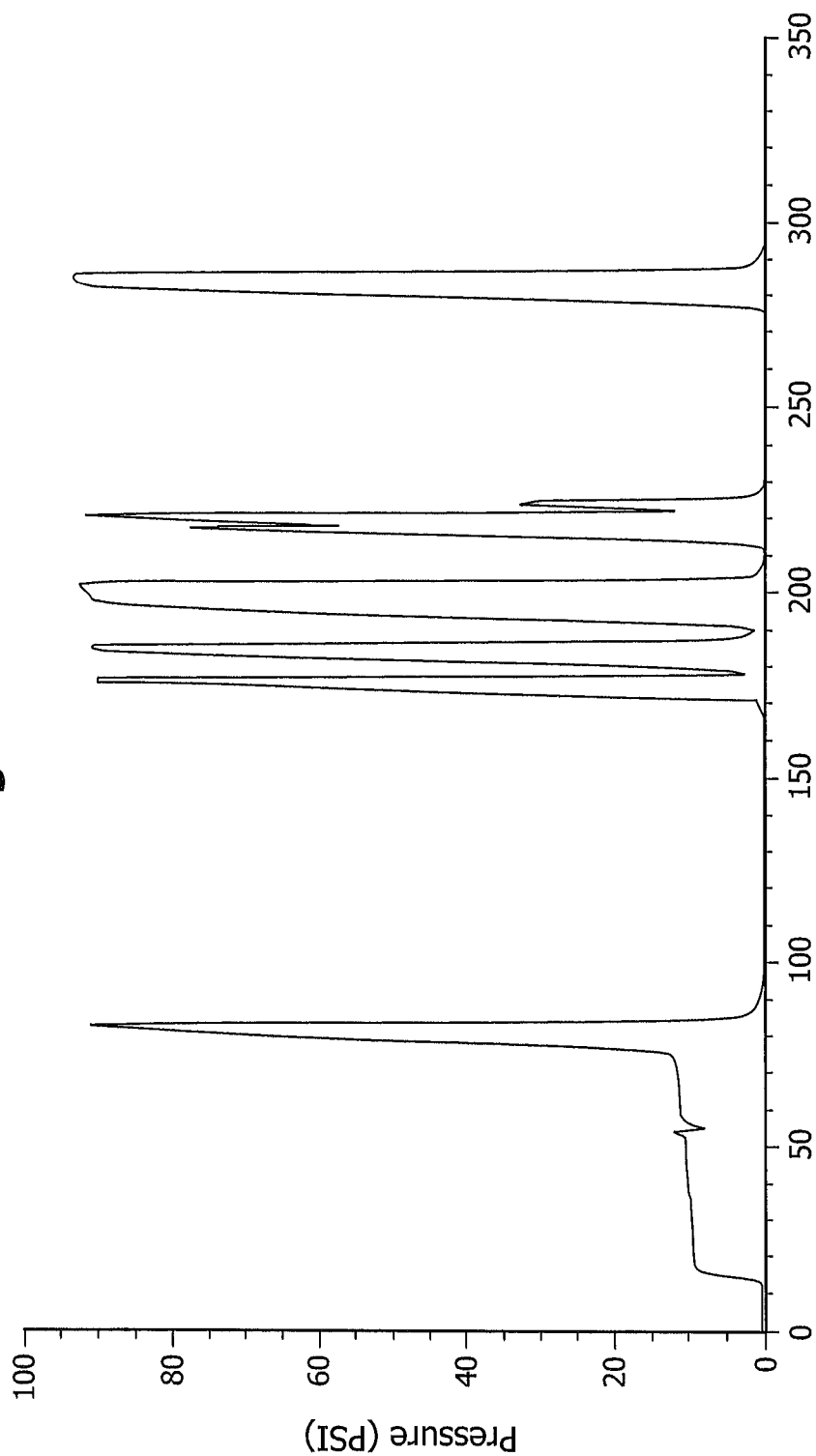
FIG. 13 is a trace of the differential pressure across the embodiment of the prior art SAP containing fuel filter monitor (depicted in FIG. 4) during pressure pulsation in a low flow water stream test.

A velcon cdf 205 n 6 inch filter monitor element was installed in a Gammon technical products (PN) 6 inch fuel filter monitor housing. The filter was primed by recirculation of Jet fuel+2% DIGEME for 30 minutes using the low flow water stream challenge set up in FIG. 8. The element was then challenged with a water slug by switching the upstream valve (47) from fuel to water feed and the downstream valve (47) to a collection vessel. Pressure was observed to rapidly rise to >90 psi in a few seconds, as shown in the pressure trace of FIG. 13 and flow was observed to stop. The pump was shut off after pressure reached >90 psi. The pump was then turned on resulting in another >90 psi pressure spike, and shut off again. This sequence was repeated for a total of 6 additional pressure spikes after the first as seen the pressure trace of FIG. 13. Afterward the downstream fluid was decanted into the collection vessel. Drops of water passing the filter were separated from the fuel using a separatory funnel. The water and fuel were quantified gravimetrically yielding 450 ml of fuel and 14.5 ml of water. The water was drained from the upstream of the monitor housing valve (52) and the valve (47) in FIG. 8 was switched to the fuel feed. This resulted in a pressure spike >90 psi and testing was discontinued.

Discussion of Examples

The above examples serve to illustrate advantages of the inventive fuel filter monitor over the prior art SAP polymer based technology. Table 1 below summarizes the results of the high flow rate water stream challenge testing. The results highlight the superior performance of the inventive membrane monitor over a modern day commercial fuel filter monitor representative of incumbent prior art. Specifically the inventive composite resists water penetration showing no water passage when challenged with water streams containing contaminants and does not show visible evidence of media migration. In contrast under the same test conditions the incumbent prior art monitor both passes water and shows visibly evident media migration.

Table 2 summarizes the results of low flow water stream challenges impinged on a novel inventive pleated membrane fuel filter monitor. The results show clearly that the element provides superior resistance to water penetration compared to a modern day commercial fuel filter monitor containing SAP. Specifically the element passed significantly less water and was reusable after drainage. Also, more over the element provided a significant reduction in resistance to flow as evidenced by a lower differential pressure.

In summary, the above examples serve to illustrate several advantages of non limiting embodiments of the instant invention.

TABLE 1

| Article | Composite Construction | SAP | Water Penetration | Minimum Amount of Water Passing Sample (ml) | Turbid Fuel/ Media Migration | Challenge Fuel |
|---|---|---|---|---|---|---|
| Example 1 | Inventive | No | No | 0 | No | Jet A + DCI4A (1 mg/L) + Stadis 450 (15 mg/L) |
| Example 2 | Inventive | No | No | 0 | No | Jet A + 2 wt % DIEGME |
| Example 3 | Inventive | No | No | 0 | No | Jet A + 1 wt % Soy Gold Biodiesel |
| Comparative Example 1 | Commercial | Yes | Yes | 20 | Yes | Jet A + DCI4A (1 mg/L) + Stadis 450 (15 mg/L) |
| Comparative Example 2 | Commercial | Yes | Yes | 12 | Yes | Jet A + 2 wt % DIEGME |
| Comparative Example 3 | Commercial | Yes | Yes | 16 | Yes | Jet A + 1 wt % Soy Gold Biodiesel |

TABLE 2

| Article | Construction | SAP | Test | # Pressure Pulses | Amount of Water Passing Sample (ml) | Amount of fuel passing sample after switch to water feed (ml) | Initial dP (psi) | dP on restart after draining water (psi) | Challenge Fuel |
|---|---|---|---|---|---|---|---|---|---|
| Example 4 | Inventive/Pleated | No | Initial | 8 | <1 | 450 | 0.89 | 1.85 | Jet A + 2 wt % DIEGME |
|  | inventive/Pleated | No | Reuse | 6 | 2 | 320 | 1.85 | na | Jet A + 2 wt % DIEGME |
| Comparative Example 4 | Commercial/Tubular | Yes | Initial | 7 | 14.5 | 635 | 9.08 | >90 | Jet A + 2 wt % DIEGME |

The invention claimed is:

1. A fuel filter monitor for use in a fuel stream having a flow direction comprising:
   (a) a ePTFE membrane, wherein said ePTFE membrane has a Bubble Point >50 PSI;
   (b) a support structure adjacent to said ePTFE membrane;
   (c) said ePTFE membrane disposed upstream of said support structure in said fuel stream;
   (d) wherein said monitor prevents penetration of water to the downstream of said fuel wet monitor, where the water can be in the form of discrete water drops in fuel, or a bulk water stream which displaces the upstream fuel;
   (e) wherein said monitor stops fluid flow when challenged with a bulk water stream; and
   (f) wherein said monitor contains no super absorbent polymer for water.

2. The fuel filter monitor of claim 1 wherein the membrane layer is inert to fuel, including fuel containing polar components including diethylene glycol monomethyl ether, fatty acid methyl esters, and biodiesel.

3. The fuel filter monitor of claim 1 wherein fuel flow can be reinstated after stoppage by challenge of a bulk water stream.

4. The fuel filter monitor of claim 1 wherein migration or passage of nonfibrous particulate into the fuel stream after the fuel filter monitor is prevented.

5. The fuel filter monitor of claim 1 wherein said support structure has an average pore opening size <850 microns.

6. The fuel filter monitor of claim 1 wherein the support structure has a burst strength >50 psi.

7. The fuel filter monitor of claim 1 wherein the support structure comprises a porous membrane.

8. The fuel filter monitor of claim 1 wherein the support structure comprises a non-woven textile.

9. The fuel filter monitor of claim 1 wherein the support structure comprises a woven textile.

10. The fuel filter monitor of claim 1 wherein the support structure and ePTFE membrane comprises a bonded composite.

11. The fuel filter monitor of claim 1 wherein migration or passage of nonfibrous particulate into the fuel stream after the fuel filter monitor is prevented in the presence of fuel stream contaminants including polar contaminants including diethylene glycol monomethyl ether, fatty acid methyl esters, and biodiesels.

12. A filter housing comprising a canister having an open and a closed end, the fuel filter monitor of claim 1 in the form of a pleated ePTFE membrane supported by a pleated nonwoven and a tubular extruded plastic support cage wherein the seams and edges of said pleated ePTFE membrane are integrally sealed in said canister such that a fuel stream passes through said pleated ePTFE membrane and out said open end of said canister.

13. The fuel filter monitor of claim 1, wherein the support structures comprises two layers.

* * * * *